United States Patent
Cunningham et al.

(10) Patent No.: US 7,460,086 B1
(45) Date of Patent: Dec. 2, 2008

(54) MULTIPLE AND HYBRID GRAPHICS DISPLAY TYPES

(75) Inventors: John Spencer Cunningham, Albuquerque, NM (US); Scott Richard Maass, Albuquerque, NM (US); Thomas A. Odegard, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1164 days.

(21) Appl. No.: 09/460,197

(22) Filed: Dec. 13, 1999

(51) Int. Cl.
  *G09G 5/00* (2006.01)
(52) U.S. Cl. ...................................... 345/3.1; 345/1.1
(58) Field of Classification Search .................. 345/3.1, 345/2.1, 181, 1.1, 1.2, 1.3, 2.2, 3.2, 3.3, 3.4; 710/22
  See application file for complete search history.

(56) References Cited

U.S. PATENT DOCUMENTS

| | | | |
|---|---|---|---|
| 3,665,454 A * | 5/1972 | Stoddard et al. ............ 345/472 |
| 4,055,004 A | 10/1977 | Chase |
| 4,631,532 A | 12/1986 | Grothe |
| 4,635,050 A | 1/1987 | Grothe et al. |
| 4,712,047 A | 12/1987 | Weindorf |
| 5,138,305 A * | 8/1992 | Tomiyasu .................... 345/213 |
| 5,499,325 A | 3/1996 | Dugan, Jr. |
| 5,513,365 A * | 4/1996 | Cook et al. .................... 710/72 |
| 5,606,657 A | 2/1997 | Dennison |
| 5,752,032 A | 5/1998 | Keller et al. |
| 5,799,204 A | 8/1998 | Pesto, Jr. |
| 5,883,642 A | 3/1999 | Thomas et al. |
| 5,910,180 A | 6/1999 | Flory et al. |
| 5,948,091 A | 9/1999 | Kerigan et al. |
| 5,960,213 A | 9/1999 | Wilson |
| 6,047,123 A * | 4/2000 | Brown et al. ................. 717/127 |
| 6,137,457 A * | 10/2000 | Tokuhashi et al. ........... 345/1.1 |
| 6,326,935 B1 * | 12/2001 | Boger .......................... 345/3.2 |

FOREIGN PATENT DOCUMENTS

WO    WO 99/39328    8/1999

OTHER PUBLICATIONS

"Method for Attachment of Multiple Dissimilar Monitors"; Jan. 1995; pp. 129-131; vol. 38, No. 01; IBM Technical Disclosure Bulletin.

* cited by examiner

*Primary Examiner*—Kevin M Nguyen
(74) *Attorney, Agent, or Firm*—McDonnell Boehnen Hulbert & Berghoff LLP

(57) ABSTRACT

A display interface device and method for an individual personal computer, workstation, or embedded system comprising one or more display interfaces; a video library; and driving any one of a plurality of video displays of a plurality of types connected to the one or more display interfaces from output of the video library. OpenGL is a preferred API. Driving of hybrid displays as well as stroke displays using formats designed for raster displays (such as VAPS) is also provided for. Real-time switching between displays is also provided for.

18 Claims, 10 Drawing Sheets

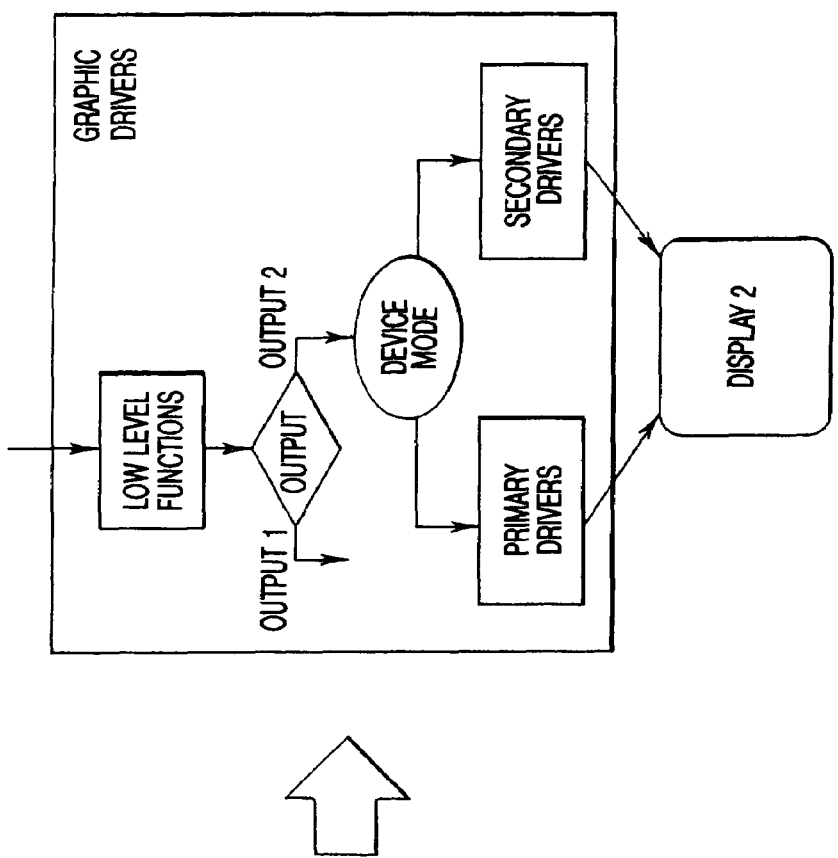
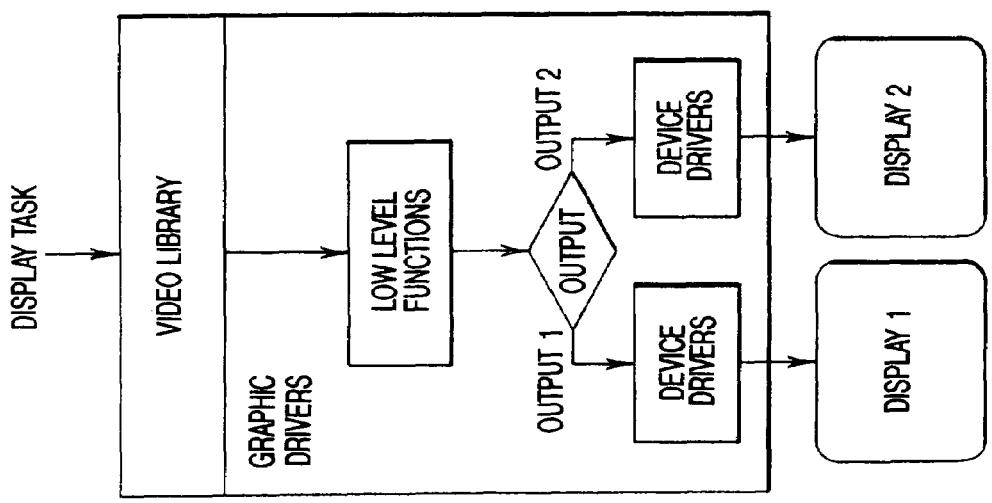
FIG-10B
FIG-10A

MULTIPLE AND HYBRID GRAPHICS DISPLAY TYPES

CROSS-REFERENCE TO RELATED APPLICATIONS

Not applicable.

BACKGROUND OF THE INVENTION

The present invention relates to computer support of multiple display types.

Present computer systems provide a certain amount of flexibility in combining multiple computer displays and display types to a single personal computer, workstation, or embedded system. For example, under the Microsoft Windows 98 operating system, it is possible to simultaneously display images on two displays, but each display must be connected to a video adapter card attached to an ISA or PCI bus via its own slot. The computer must be configured (not in real time) to support the two different adapter cards and the displays attached to them. Graphic libraries and drivers must be identified and employed for each output display type. Different displays cannot be easily swapped without extensive configuration.

The following patents relate to the display portability problem addressed above: U.S. Pat. No. 5,960,213, to Wilson, entitled "Dynamically Reconfigurable Multi-Function PCI Adapter Device; U.S. Pat. No. 5,948,091, to Kerigan et al., entitled "Universal Digital Display Interface"; U.S. Pat. No. 5,910,180, to Flory et al., entitled "Context Virtualizing Device Driver Architecture"; U.S. Pat. No. 5,883,642, to Thomas et al., entitled "Programmable Retargeter Method and Apparatus"; U.S. Pat. No. 5,799,204, to Pesto, Jr., entitled "System Utilizing BIOS-Compatible High Performance Video Controller Being Default Controller at Boot-Up and Capable of Switching to Another Graphics Controller After Boot-Up"; U.S. Pat. No. 5,752,032, to Keller et al., entitled "Adaptive Device Driver Using Controller Hardware Sub-Element Identifier"; and U.S. Pat. No. 5,606,657, to Dennison et al., entitled "Virtual Graphics Processor for Embedded Real Time Display Systems". However, unlike with the present invention, none of these solutions provide a single display adapter than can simultaneously handle and switch between multiple displays and display types.

Furthermore, the existence of both raster and stroke display types renders it difficult to use raster-oriented graphics applications with stroke display types. For example, Visual Applications Builder (VAPS®) formats, which is a common tool in the industry for building interactive display application data as graphics or generated code, are unable to drive stroke displays or to properly work with hybrid stroke/raster displays in both modes. The following patents relate generally to this problem, but none provide the ability of the present invention to drive stroke and hybrid displays using VAPS® formats: U.S. Pat. No. 5,499,325, to Dugan, Jr., entitled "Brightness Controls for Visual Separation of Vector and Raster Information"; U.S. Pat. No. 4,635,050, to Grothe et al., entitled "Dynamic Stroke Priority Generator for Hybrid Display"; U.S. Pat. No. 4,631,532, to Grothe, entitled "Raster Display Generator for Hybrid Display System"; and U.S. Pat. No. 4,055,004, to Chase, entitled "Full Color Hybrid Display for Aircraft Simulators.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention is of a display interface device and method comprising: providing one or more display interfaces connectable to a computer bus of an individual personal computer, workstation, or embedded system; providing a video library; and driving any one of a plurality of video displays of a plurality of types connected to the one or more display interfaces from output of the video library. In a preferred embodiment, the video library comprises video library information, such as OpenGL information. OpenGL is a software interface to graphics hardware (the 'GL' stands for Graphics Library). This interface consists of several hundred functions that allow programmers to specify the objects and operations needed to produce high-quality color images of three-dimensional objects. Driving of both stroke and raster display types can be done, as well as simultaneous driving of stroke display(s) of different types or raster display(s) of same or different types (e.g., flat panel display (FPD), heads up display (HUD), multipurpose display (MPD), multipurpose color display (MPCD), as shown in FIG. 8). Hybrid stroke/raster displays can also be driven. The display interface can be provided by a plurality of interface card mezzanines. Dynamic switching between displays in real time is preferably employed.

The present invention is additionally of a device and method for driving stroke displays using formats designed for raster displays (such as VAPS) comprising: linking generated code from the formats to a standard graphics library; and providing stroke video drivers that ignore raster masking. In a preferred embodiment, linking is to an OpenGL library. The stroke video drivers preferably use occlusion memory in place of raster masking. Both stroke and raster displays can be driven and switching dynamically between them is possible in real time.

The present invention is also of a device and method for driving multiple displays of different types using formats designed for raster displays (such as VAPS) comprising: linking generated code from the formats to a standard graphics library; driving a plurality of displays of different types from output of the graphics library; and dynamically switching between the displays in real time. In a preferred embodiment, linking is to an OpenGL graphics library. Driving is of both stroke and raster display types, and the stroke video drivers are employed using occlusion memory in place of raster masking. Driving of hybrid stroke/raster displays can be performed.

The present invention is further of a device and method for driving a hybrid stroke/raster display using formats designed for raster displays (such as VAPS) comprising: linking generated code from the formats to a standard graphics library; and providing stroke and raster display inputs from output of the graphics library. In a preferred embodiment, linking is to an OpenGL graphics library. The stroke video drivers preferably use occlusion memory in place of raster masking. Dynamic switching can occur between stroke and raster video drivers in real time.

A primary object of the present invention is to provide a single video adapter interface that can drive multiple displays of the same, different, and/or hybrid types.

Another object of the present invention is to provide the ability to drive stroke displays using VAPS formats.

A further object of the present invention is to provide the ability to drive hybrid stroke/raster displays using VAPS formats.

A primary advantage of the present invention is the greatly enhanced portability of displays and display types between systems without extensive reconfiguration required.

Another advantage of the present invention is that it promotes reusable display formats and reduces the amount of testing needed to deploy graphics software on new and different display types.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 10 is a flow diagram for decision making concerning device driver switching.

DETAILED DESCRIPTION OF THE INVENTION

The present invention provides the ability to, on a single workstation, personal computer, or embedded system, and using a single interface card if desired, drive multiple displays of different types and to dynamically switch between them in real time. A commercial standard graphics library (such as OpenGL) is employed together with dynamically switchable driver sets allowing support of multiple displays of different types. The invention also provides the ability to use raster-based display formats (such as VAPS) with stroke or hybrid raster/stroke displays.

The present invention enhances reusability by enabling a single display routine to drive a variety of output types without the necessity of creating separate display routines for each output type. By using a commercial standard graphics library to create the display routine and tailoring the specific driver functions to work with the graphics library, as well as requiring all graphic interface to be through the graphics library, all hardware modes are isolated to the device drivers. Device drivers can then be created and modified to match the output without changing the display routine interface. The device driver set necessary to drive the varying output type is associated with each graphic context. When a graphic context is switched, the drivers are switched and a different output can be displayed to. The drivers can be switched dynamically, which makes multiple simultaneous outputs possible. This also allows for the support of hybrid modes in which multiple drivers can operate for the same output and drive raster and stroke on the same display if that display is capable. The architecture conveniently supports multiple displays, various modes (e.g., stroke and raster), and future display types and hardware that may be developed. A common software platform is thereby created that can be used transparently for a wide range of hardware and software applications. As an example, development of and modifications to graphics intensive operational flight program software are greatly enhanced by the present invention.

The invention also enhances reusability by permitting the same VAPS frame to be used to create display pages for both raster and stroke displays that will look the same. Again, a commercial standard graphics library is employed for linking the VAPS generated code to the display drivers. Accommodations are made in the stroke drivers to ignore masking that is used by raster displays and allow for the same effect by using occlusion memory for the stroke display. A new graphics context is used for each virtual CRT as well as treating each virtual CRT as a root CRT to get proper scaling. Each graphic context is tied to a specific output driver set, and hybrid mode can be used with VAPS by switching output drivers within a graphics context. Multiple outputs are also enabled in this manner by creating additional virtual CRTs using different device drivers.

Figure 1:
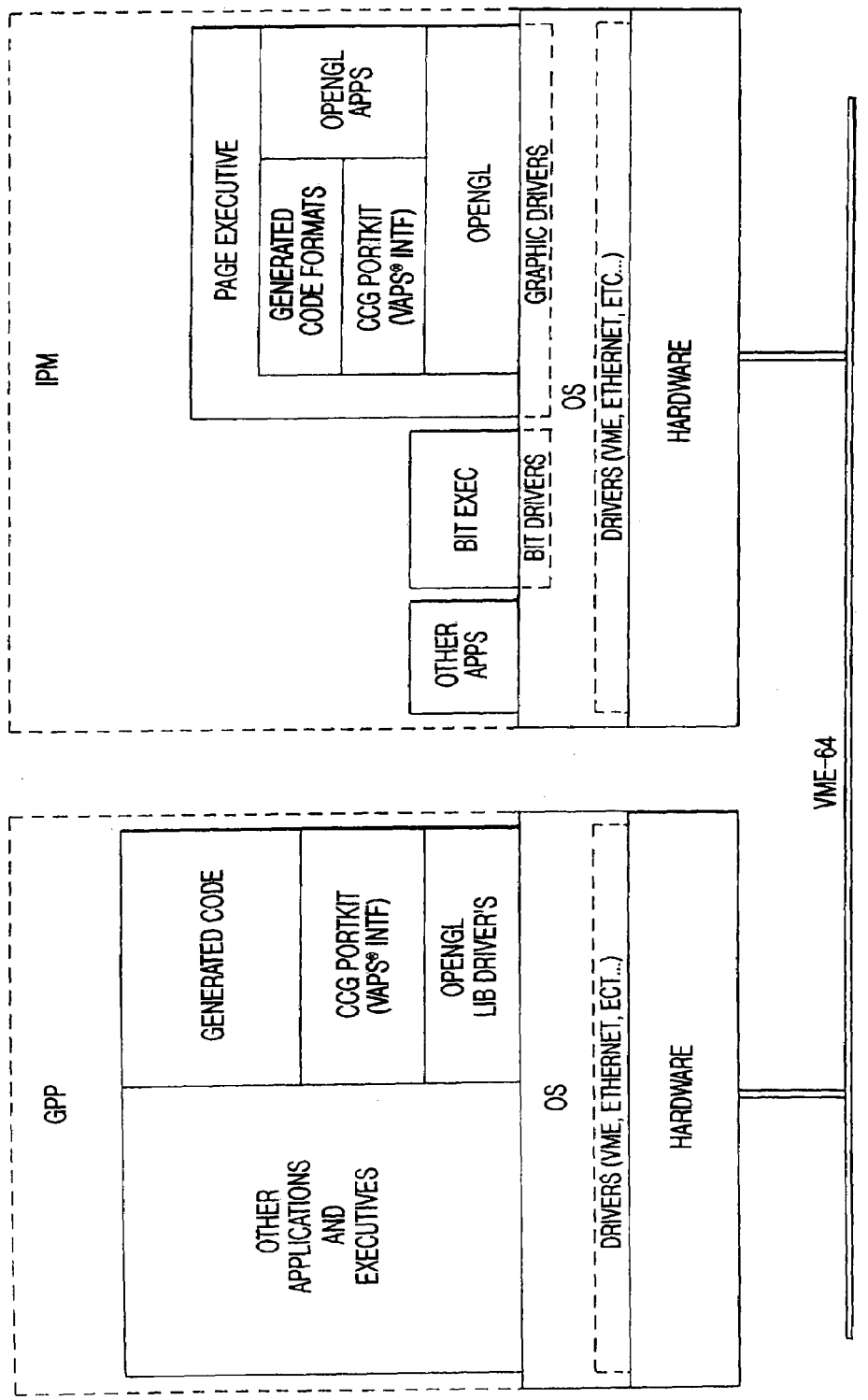
FIG. 1 illustrates in hierarchical form the software running under the invention on a General Purpose Processor (GPP; the workstation, personal computer, or embedded system microprocessor) in combination with a reconfigurable image processing module (IPM)
Figure 2:
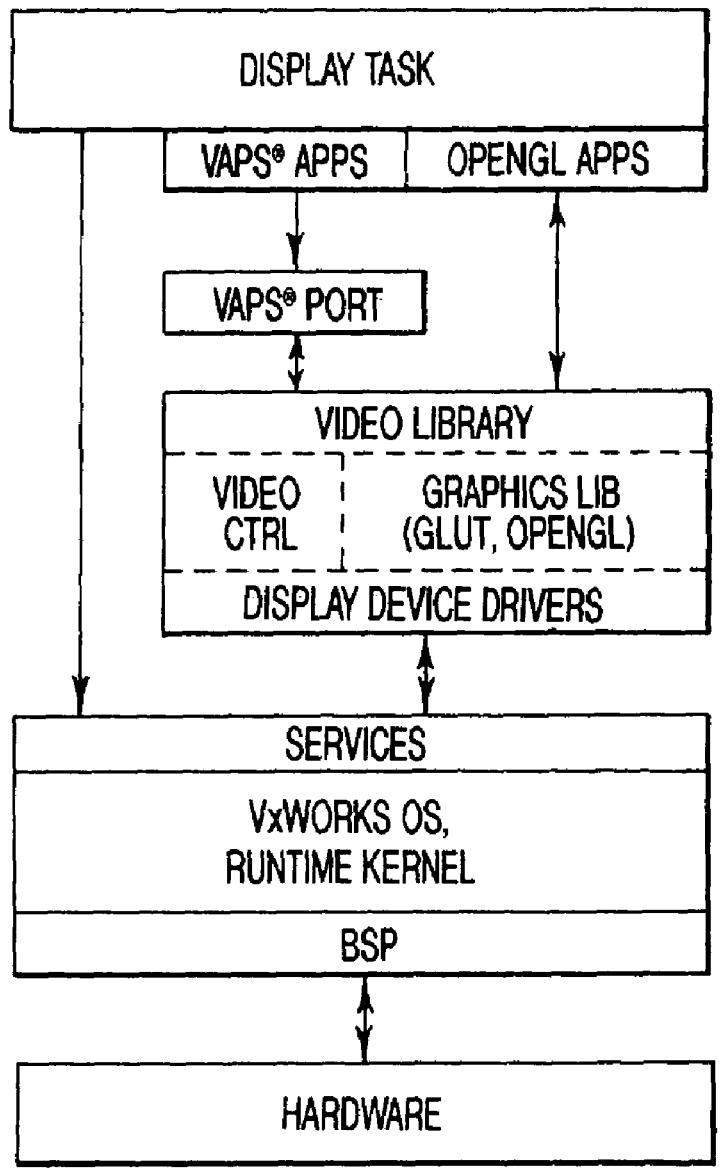
FIG. 2 further illustrates in hierarchical form the software running on an IPM or equivalent hardware.
Figure 3:
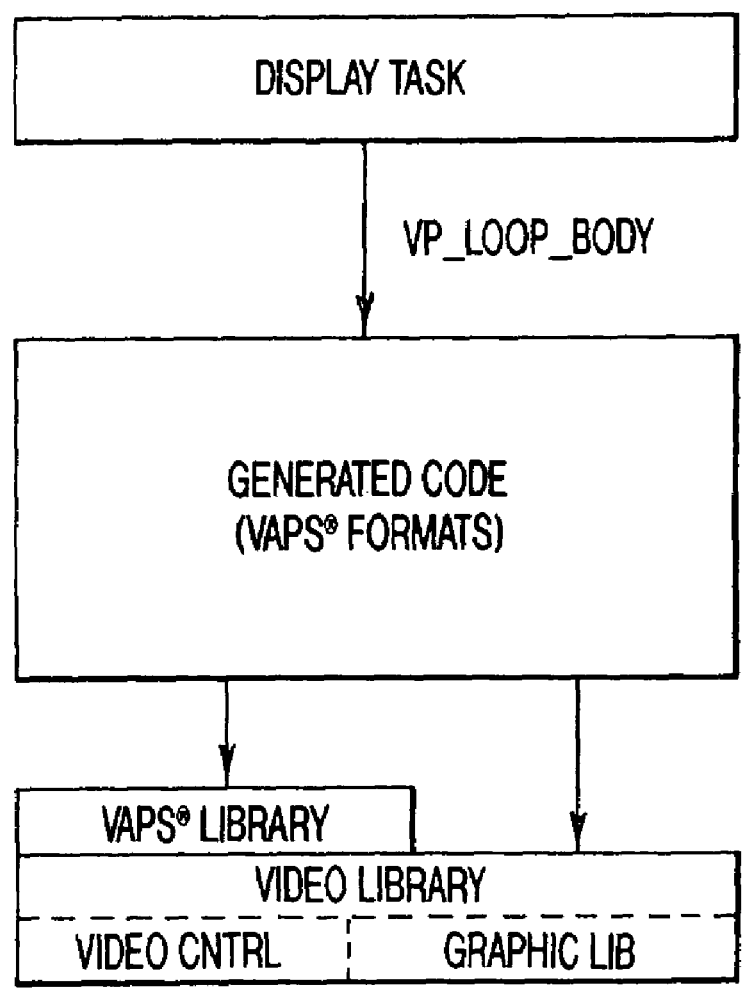
FIG. 3 illustrates an implementation of a user interface (in this case, VAPS) to the video library of the invention.
Figure 5:
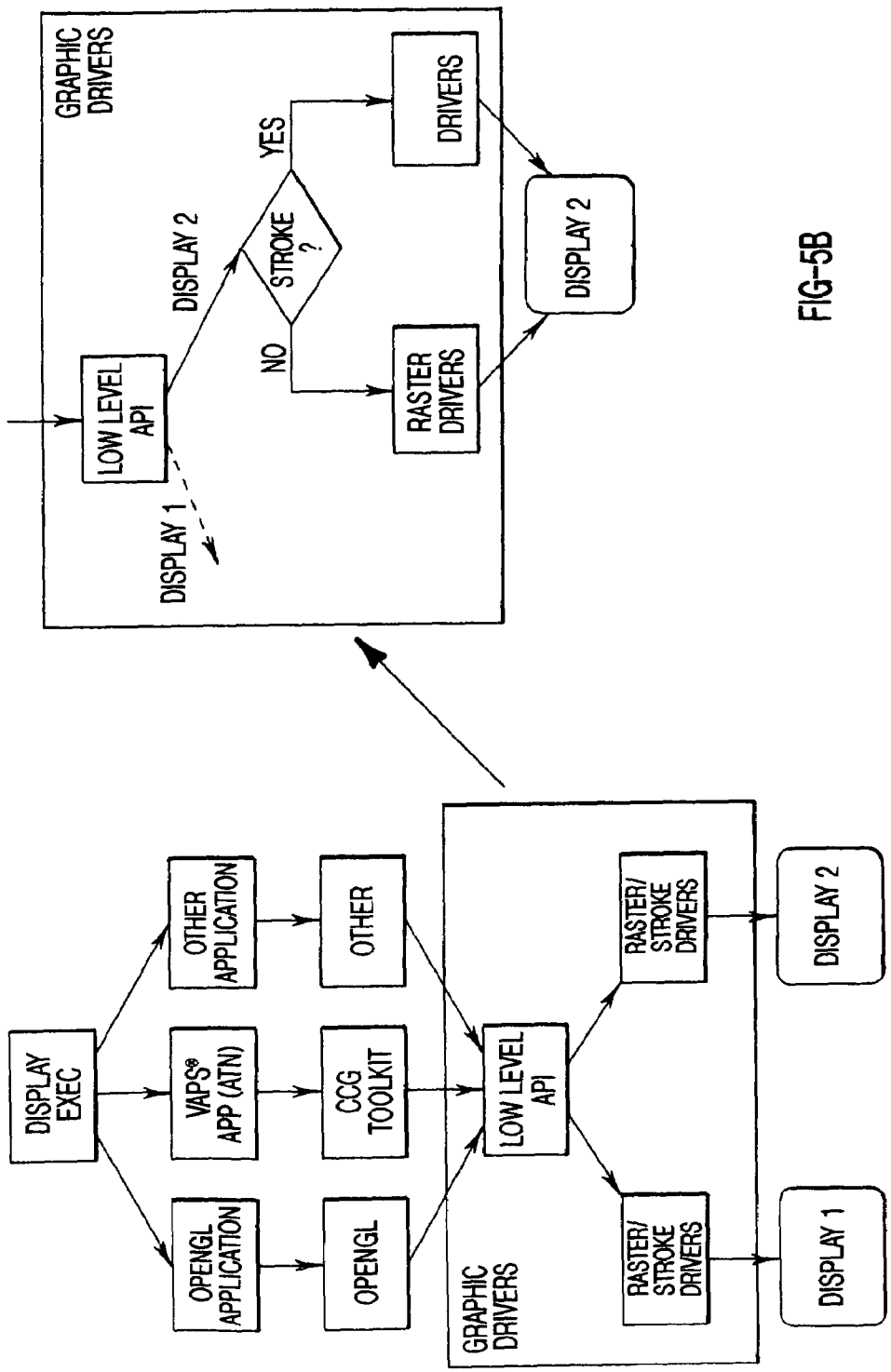
FIGS. 5-7 are block diagrams of data and control flow through the low level Application Programmer's Interface (API) graphic drivers to the displays in different display and display type configurations.
Figure 6:
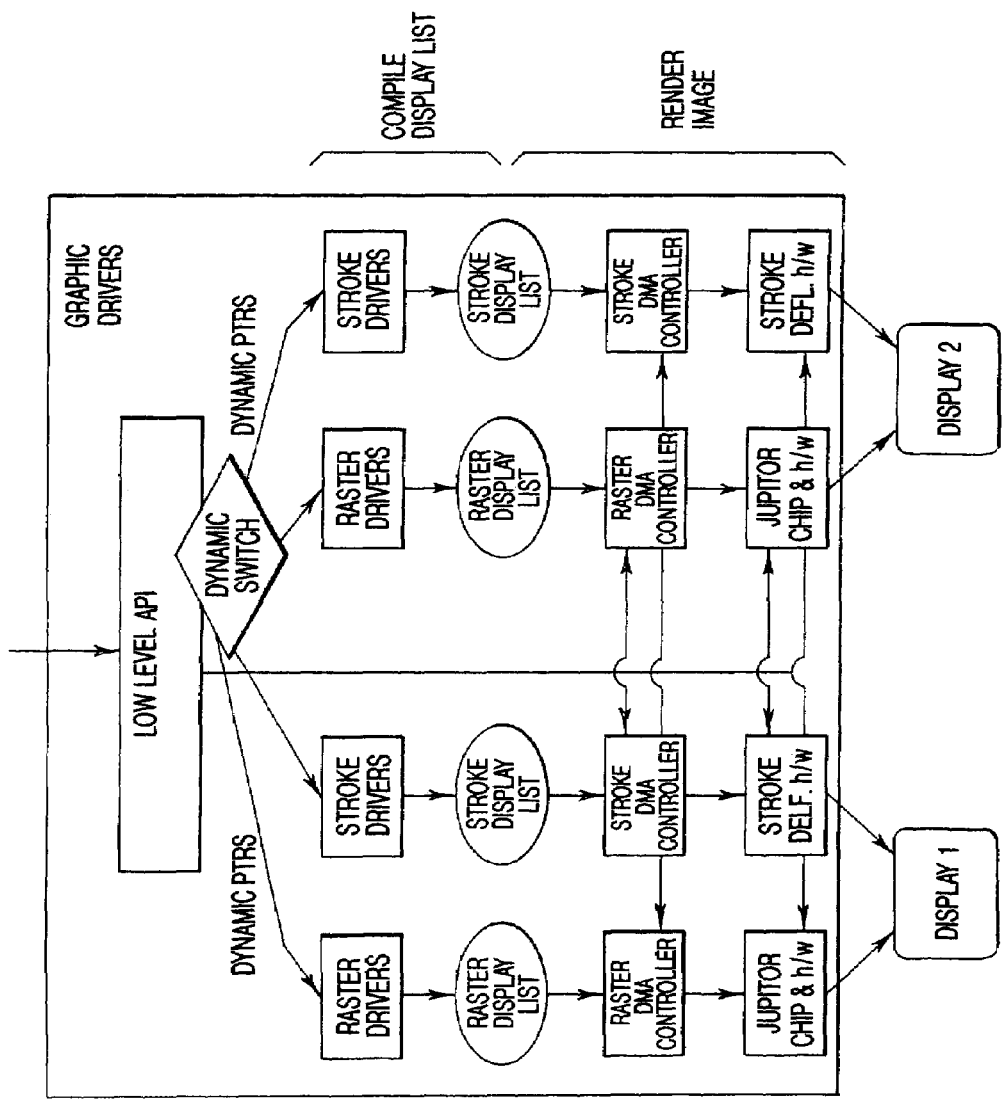
Figure 7:
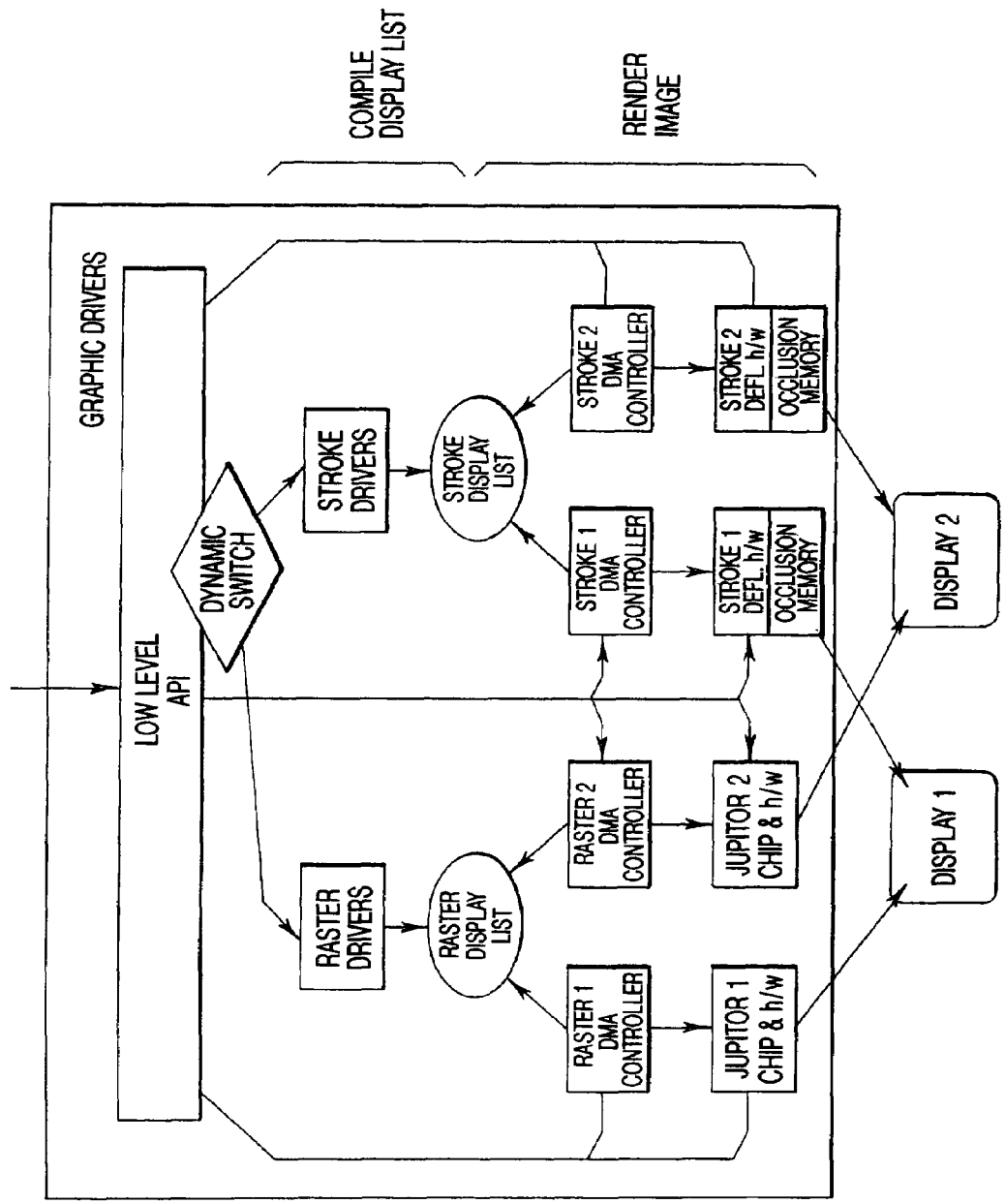

The software preferably employed in the embodiment of the invention employing an image processing module manufactured by Honeywell (IPM; e.g., a single VME card having a plurality of mezzanines for connection to a plurality of displays) includes a Real-Time Operating System (RTOS) such as VxWorks, the Tornado development environment, the OpenGL graphics language, and the Visual Applications Builder (VAPS®) display format development tool. FIG. 1 illustrates in block form the software running both on a General Purpose Processor (GPP; the workstation, personal computer, or embedded system microprocessor) and on the IPM. Shaded areas indicate reusable software. FIG. 2 provides additional detail. FIGS. 5-7 are block diagrams of data and control flow through the low level API graphic drivers to the displays in different display and display type configurations. FIGS. 5B and 10B depict the dynamic switch logic. Low level API pointers to the display's raster or stroke drivers are preferably initialized only once during power-on initialization. FIG. 3 illustrates an implementation of a user interface (in this case, VAPS®) to the video library.

Figure 4:
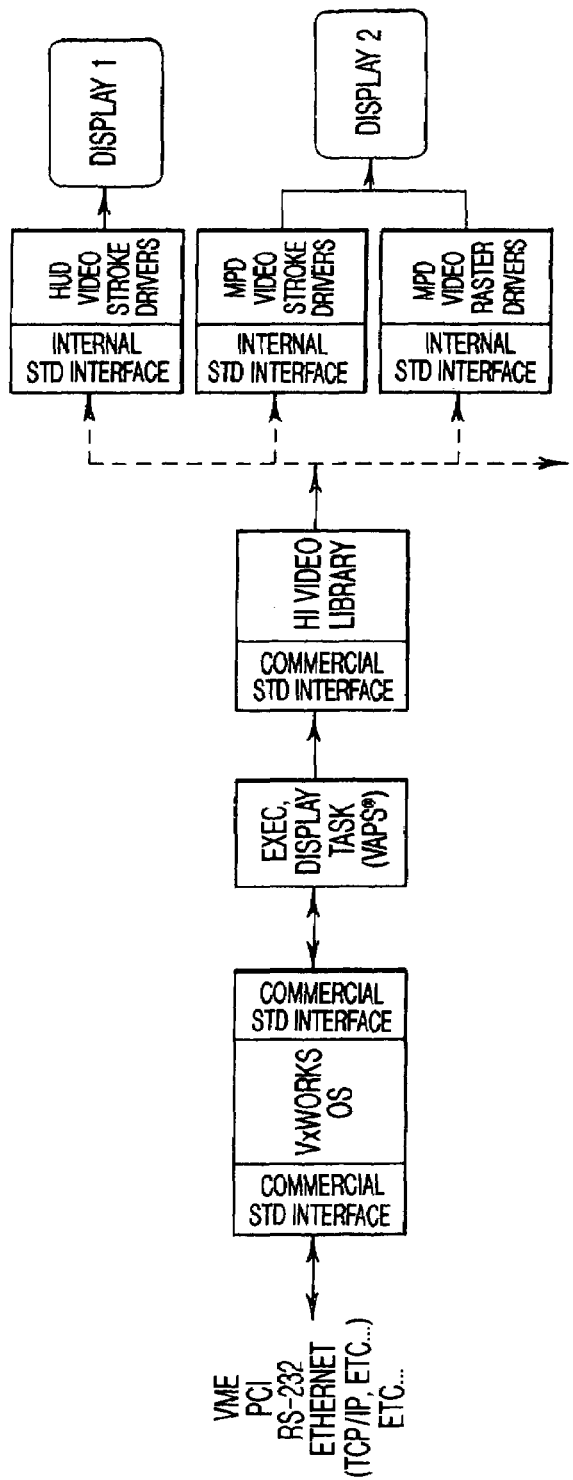
FIG. 4 illustrates the data and control flow from the display task through to the video driver outputs when code is employed to drive one or more displays of one or more display types.

The present invention also permits the same VAPS frame to drive both stroke and raster displays. A commercial standard graphics library (e.g., OpenGL) links VAPS generated code to the display drivers to do either raster or stroke. The stroke display drivers are preferably modified to ignore raster masking and to use occlusion memory instead. FIG. 4 illustrates the data and control flow from the display task through to the video driver outputs.

Hybrid displays can be driven from VAPS generated code as well as multiple displays. VAPS was designed to drive a single raster output display, but the present invention permits it to go beyond that limitation. The VAPS portkit is modified to create a new graphics context for each virtual CRT. Each virtual CRT is treated as a root CRT in order to achieve proper scaling. A commercial standard graphics library (e.g., OpenGL) links the VAPS generated code to the display drivers and each graphic context is tied to a specific output driver set. Hybrid mode is rendered possible by switching output drivers within a graphics context. Multiple outputs are rendered possible by creating additional virtual CRTs using different device drivers.

Figure 8:
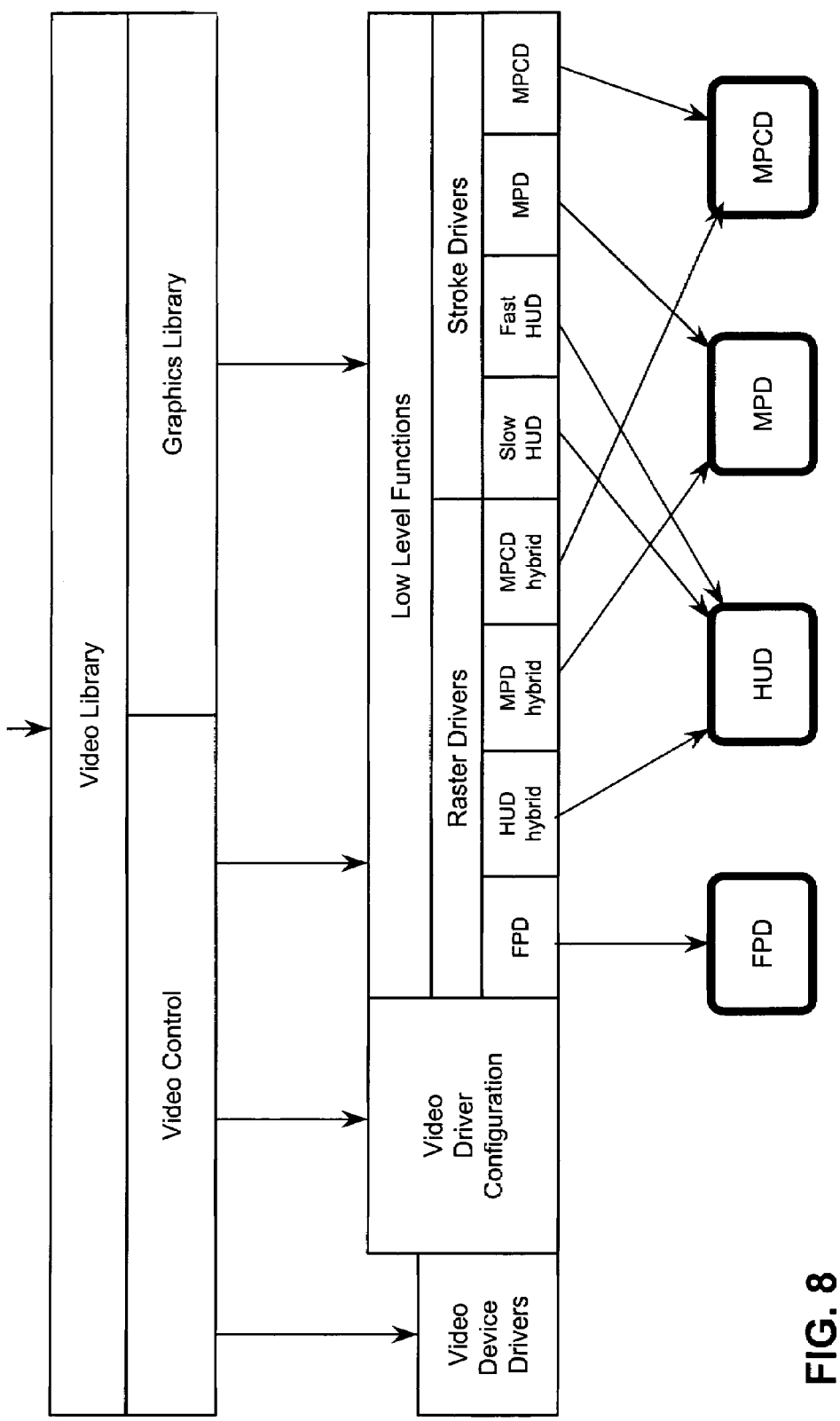
FIG. 8 is a block illustration providing an overview of an implementation of the video library of the invention and its relationships to the video hardware and other software.

Preferred design descriptions for the software of the invention next follow:

Referring to FIG. 8, the preferred Video Library is a software interface for graphics hardware that allows programs that use it to produce high quality graphic images. The library allows a standard commercial interface to be able to drive a variety of output types. The Video Library preferably comprises a graphics module which contains Graphics Library Utility Tools (GLUT) and OpenGL functions, a video control module which contains video functions that are not handled by the graphics module, and a device drivers module which communicates directly with the hardware. The device drivers are the functions that can be replaced to match the targeted hardware. Multiple drivers can be used simultaneously.

The video control module is a set of functions that are needed for the image processing module that can not be accomplished using the Open GL libraries or the GL utility tool kit. This supports functions that are common among the drivers. Preferred data structures include: display, context, driver, and hybrid mode control, and hardware specific interfaces.

The graphics library includes a subset of Open GL functions and Open GL utility tool kit functions.

A subset of the GLUT kit library is preferably implemented for the image processing module of the invention. This library contains the functions necessary to initialize the display and setup the windows to put graphics in. This library follows the functional description of the GLUT API. The preferred data structures employed include the following: contexts initialization, context switching (device drivers switched with context), swapping buffers, color palettes control, animation control, and window state retrieval.

Figure 9:
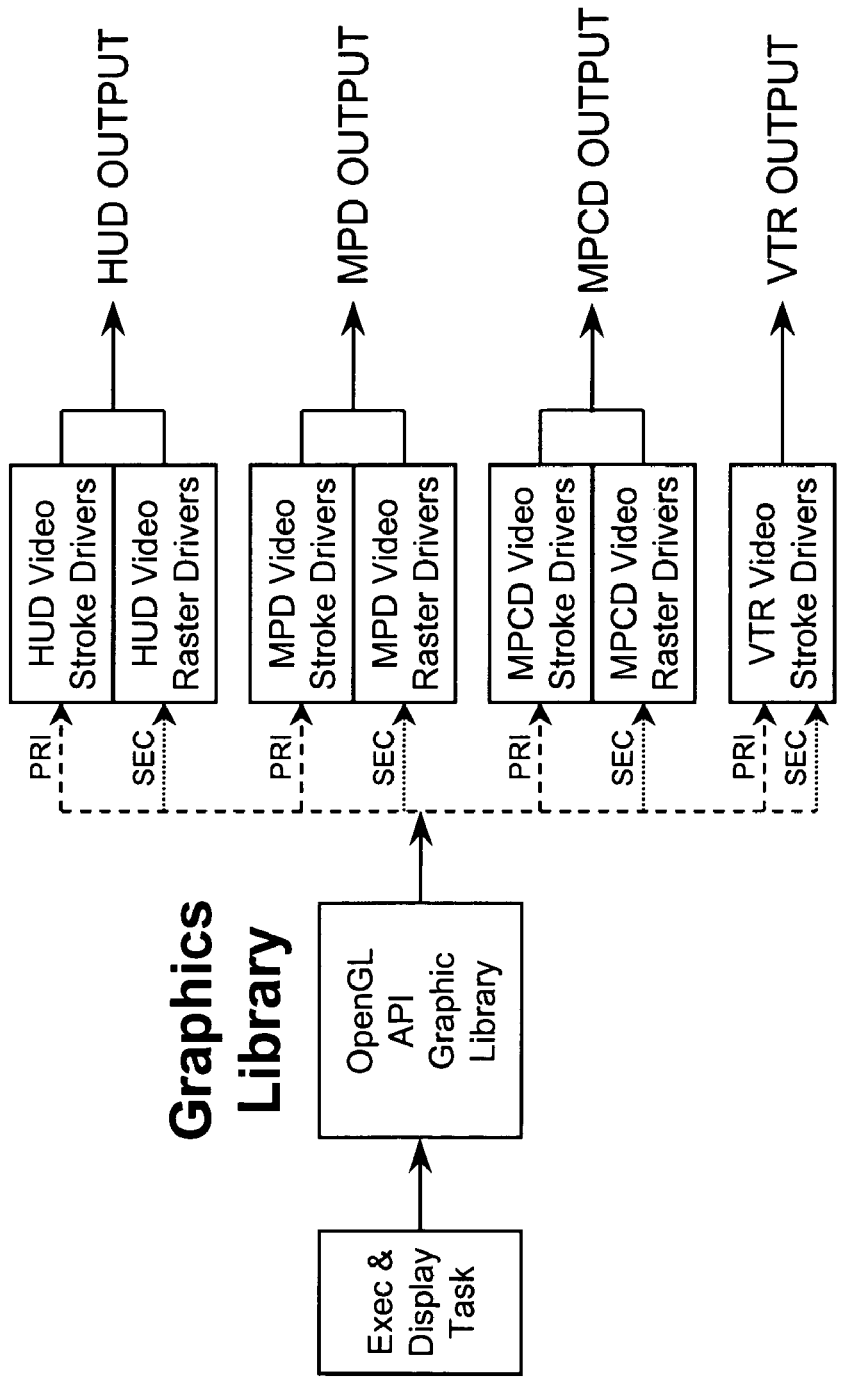
FIG. 9 is a block diagram demonstrating device driver switching in the invention.

Referring to FIGS. 9 and 10, the low level functions are the interface to the device drivers that get swapped out depending on the output that is being used. These calls are made by video control and graphics libraries and are not called directly by the display program.

The Graphics Library is intended to provide the only interface to the low level graphic drivers. The graphics library includes a subset of Open GL functions, Open GL utility functions, and Open GL utility tool kit functions.

The detailed descriptions for the preferred API GL Utility Functions are specified: in OpenGL Programming for the X Window System, Mark J. Kilgard, Addison-Wesley, ISBN 0-20148359-9.

The detailed descriptions for the preferred API OpenGL functions are specified in: OpenGL Reference Manual, Second Edition, Addison-Wesley, ISBN 0-201-46140-4.

In summary, the present invention provides the ability to, on a single workstation, personal computer, or embedded system, and using a single interface card if desired, drive multiple displays of different types and to dynamically switch between them in real time. Raster-based display formats (such as VAPS) can also be used with stroke or hybrid raster/stroke displays. The invention thereby enhances reusability by enabling a single display routine to drive a variety of output types without the necessity of creating separate display routines for each output type. The architecture conveniently supports multiple displays, various modes (e.g., stroke and raster), and future display types and hardware that may be developed. A common software platform is thereby created that can be used transparently for a wide range of hardware and software applications.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto. The entire disclosures of all references, applications, patents, and publications cited above are hereby incorporated by reference.

The embodiments of an invention in which an exclusive property or right is claimed are defined as follows:

1. A computer device for driving multiple displays of different types using formats designed for raster displays, said device comprising:

means for linking generated code from said formats to a standard graphics library;

means for driving a plurality of displays of different types with a single display routine, said plurality of displays comprising stroke displays, raster displays and hybrid displays, wherein said hybrid displays comprise stroke and raster displays, from output of said graphics library; and means for dynamically switching between said displays in real time.

2. The device of claim 1, wherein said graphics library comprises an OpenGL graphics library.

3. The device of claim 2, wherein said formats comprise generated code formats.

4. The device of claim 3, wherein said driving means comprise stroke video drivers using occlusion memory.

5. A computer device for driving a hybrid stroke/raster display using formats designed for raster displays, said device comprising:
- means for linking generated code from said formats to a standard graphics library;
- driving said hybrid stroke and raster display with a single display routine; and
- means for providing stroke and raster display inputs from output of said graphics library.

6. The device of claim 5, wherein said graphics library comprises an OpenGL graphics library.

7. The device of claim 5, further comprising stroke video drivers using occlusion memory.

8. The device of claim 5 further comprising means for dynamically switching between stroke and raster video drivers in real time.

9. The device of claim 5, wherein said formats comprise generated code formats.

10. A method for driving multiple displays of different types using formats designed for raster displays, the method comprising the steps of:
- linking generated code from the formats to a standard graphics library;
- driving a plurality of displays of different types with a single display routine, the plurality of displays comprising stroke displays, raster displays and hybrid displays, wherein the hybrid displays comprise stroke and raster displays, from output of the graphics library; and
- dynamically switching between the displays in real time.

11. The method of claim 10, wherein the linking step comprises linking to an OpenGL graphics library.

12. The method of claim 10, wherein the linking step comprises linking generated code.

13. The method of claim 10, wherein the driving step comprises employing stroke video drivers using occlusion memory rather than raster masking.

14. A method for driving a hybrid stroke/raster display using formats designed for raster displays, the method comprising the steps of:
- linking generated code from the formats to a standard graphics library;
- driving the hybrid stroke and raster display with a single display routine; and
- providing stroke and raster display inputs from output of the graphics library.

15. The method of claim 14, wherein the linking step comprises linking to an OpenGL graphics library.

16. The method of claim 14 further comprising the step of providing stroke video drivers using occlusion memory.

17. The method of claim 14 further comprising the step of dynamically switching between stroke and raster video drivers in real time.

18. The method of claim 17, wherein the linking step comprises linking generated code.

* * * * *

UNITED STATES PATENT AND TRADEMARK OFFICE
CERTIFICATE OF CORRECTION

PATENT NO. : 7,460,086 B1 Page 1 of 1
APPLICATION NO. : 09/460197
DATED : December 2, 2008
INVENTOR(S) : John Spencer Cunningham, Scott Richard Maass and Thomas A. Odegard It is certified that error appears in the above-identified patent and that said Letters Patent is hereby corrected as shown below:

In Column 6, line 64, replace "of claim 2," with "of claim 1,"

In Column 6, line 66, replace "of claim 3," with "of claim 1,"

Signed and Sealed this

Twenty-fourth Day of February, 2009

JOHN DOLL
*Acting Director of the United States Patent and Trademark Office*